US010518806B1

(12) United States Patent
Bell et al.

(10) Patent No.: US 10,518,806 B1
(45) Date of Patent: Dec. 31, 2019

(54) ULTRASONIC LOCATING

(71) Applicant: Ford Global Technologies, LLC, Dearborn, MI (US)

(72) Inventors: Christopher W. Bell, Livonia, MI (US); John Paul Gibeau, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/051,952

(22) Filed: Aug. 1, 2018

(51) Int. Cl.
| | |
|---|---|
| *B62D 15/02* | (2006.01) |
| *G01S 7/539* | (2006.01) |
| *G01S 3/809* | (2006.01) |
| *G05D 1/02* | (2006.01) |
| *G01S 15/04* | (2006.01) |
| *B60W 10/18* | (2012.01) |
| *G01S 15/93* | (2006.01) |

(52) U.S. Cl.
CPC .......... *B62D 15/0285* (2013.01); *G01S 3/809* (2013.01); *G01S 7/539* (2013.01); *G01S 15/04* (2013.01); *G05D 1/0223* (2013.01); *B60W 10/18* (2013.01); *G01S 2015/932* (2013.01); *G05D 2201/0213* (2013.01)

(58) Field of Classification Search
CPC ..... B62D 15/0285; G01S 7/539; G01S 3/809; G01S 15/04; G01S 2015/932; G05D 1/0223; G05D 2201/0213; B60W 10/18
See application file for complete search history.

(56) References Cited

U.S. PATENT DOCUMENTS

| 5,347,273 | A | * | 9/1994 | Katiraie | ................. | A61H 3/061 340/435 |
|---|---|---|---|---|---|---|
| 5,581,232 | A | * | 12/1996 | Tanaka | .................... | G01H 11/06 340/435 |
| 8,060,339 | B2 | | 11/2011 | Ammar | | |
| 8,804,460 | B1 | * | 8/2014 | Price | ..................... | G01S 3/8083 367/127 |
| 9,881,276 | B2 | * | 1/2018 | Cohn | .................. | G06Q 10/087 |
| 2005/0184859 | A1 | * | 8/2005 | Li | .......................... | B60Q 9/006 340/435 |
| 2007/0091625 | A1 | * | 4/2007 | Kim | ......................... | B60R 1/12 362/494 |
| 2018/0095057 | A1 | * | 4/2018 | McQuillen | ........... | G01N 29/024 |
| 2018/0095058 | A1 | * | 4/2018 | McQuillen | ........... | G01N 29/032 |
| 2018/0095059 | A1 | * | 4/2018 | McQuillen | ........... | G01N 29/032 |

* cited by examiner

*Primary Examiner* — Frederick M Brushaber
(74) *Attorney, Agent, or Firm* — David Kelley; Brooks Kushman P.C.

(57) ABSTRACT

A system for a vehicle includes an ultrasonic sensor including a layer of material such that vibration of the material is indicative of frequency of transmitted and received ultrasonic signals, and a controller configured to, through electrical excitation, cause the material to vibrate to transmit an inquiry ultrasonic signal and, responsive to receiving from an object an acknowledgement ultrasonic signal having frequency different from frequency of the inquiry signal, steer the vehicle from the object.

19 Claims, 4 Drawing Sheets

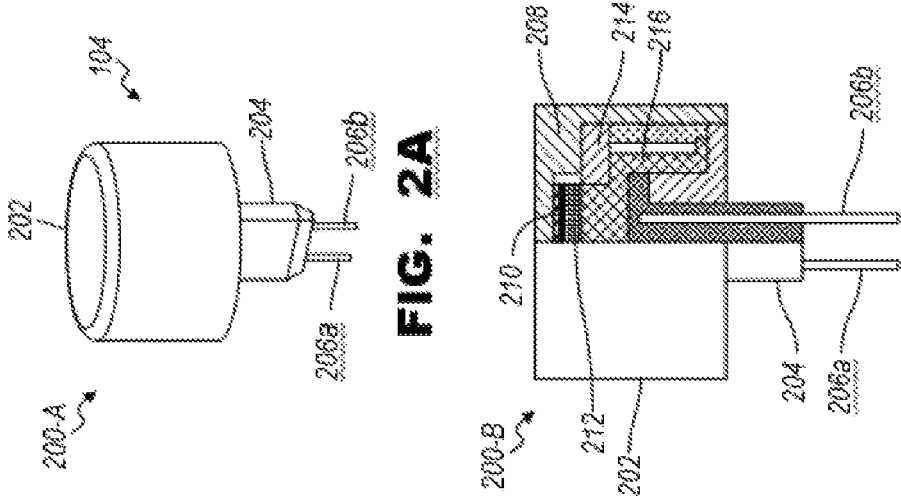
FIG. 2A
FIG. 2B
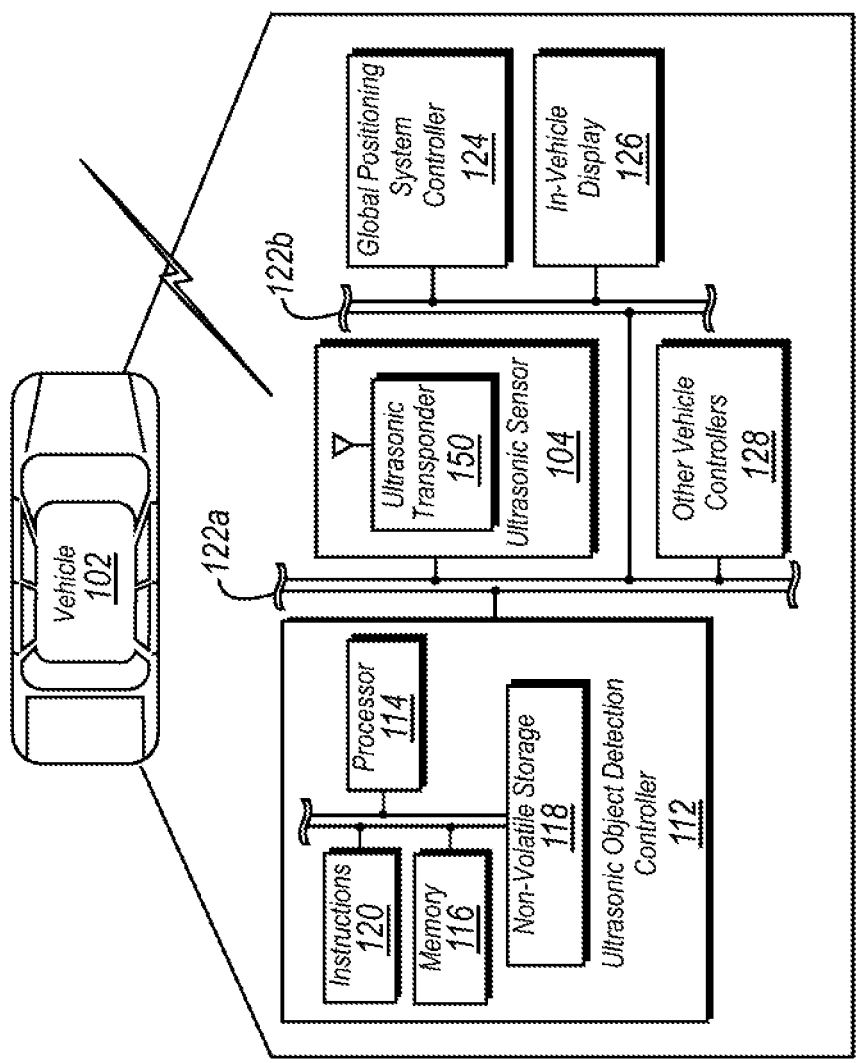
FIG. 1B

ULTRASONIC LOCATING

TECHNICAL FIELD

The present disclosure relates to systems and methods for multi-band ultrasonic locating.

BACKGROUND

Operation of a motor vehicle may include being aware of multiple external factors, such as stationary and moving objects, people, and animals, traffic signals, roadway signage, and so on. As some examples, the external factors may include parked and moving vehicles, bicyclists, pedestrians, one-way street and speed limit signs, and so on. Additionally or alternatively, driving may include maneuvering the vehicle in physically constrained areas or in areas with poor visibility.

One or more vehicle object-detection systems, such as radio detection and ranging (RADAR) and light detection and ranging (LIDAR), may be used to detect objects external to the vehicle. In some instances, RADAR and LIDAR systems may be configured to detect external objects, or "targets", in the vicinity of the vehicle. The vehicle object-detection systems may determine a distance to the external object, i.e., a target range, and speed at which the object is moving toward or away from the vehicle, i.e., a target range rate. The vehicle object-detection systems may be configured to determine a likelihood of collision between the vehicle and the external object.

SUMMARY

A system for a vehicle includes an ultrasonic sensor including a layer of material such that vibration of the material is indicative of frequency of transmitted and received ultrasonic signals, and a controller configured to, through electrical excitation, cause the material to vibrate to transmit an inquiry ultrasonic signal and, responsive to receiving from an object an acknowledgement ultrasonic signal having frequency different from frequency of the inquiry signal, steer the vehicle from the object.

A method for a vehicle includes steering, by a controller, the vehicle away from an object responsive to an acknowledgement ultrasonic signal received via an ultrasonic sensor, that includes a layer of material such that vibration of the material is indicative of frequency of transmitted and received ultrasonic signals, and having frequency different from frequency of an inquiry signal previously generated by the sensor.

An object detection system for a vehicle includes an ultrasonic sensor including piezoelectric crystals, and a controller configured to power electrical excitation to cause the crystals to oscillate generating an inquiry ultrasonic signal toward an object and steer the vehicle from the object responsive to a difference, between corresponding frequencies of the inquiry signal and an acknowledgement ultrasonic signal from the object, being greater than a threshold.

BRIEF DESCRIPTION OF THE DRAWINGS

FIG. 1B is a block diagram illustrating a component arrangement of the ultrasonic object detection system;

FIG. 2A is a perspective view of an ultrasonic object detection sensor;

FIG. 2B is a cross-section view of the ultrasonic object detection sensor;

DETAILED DESCRIPTION

Figure 1A:
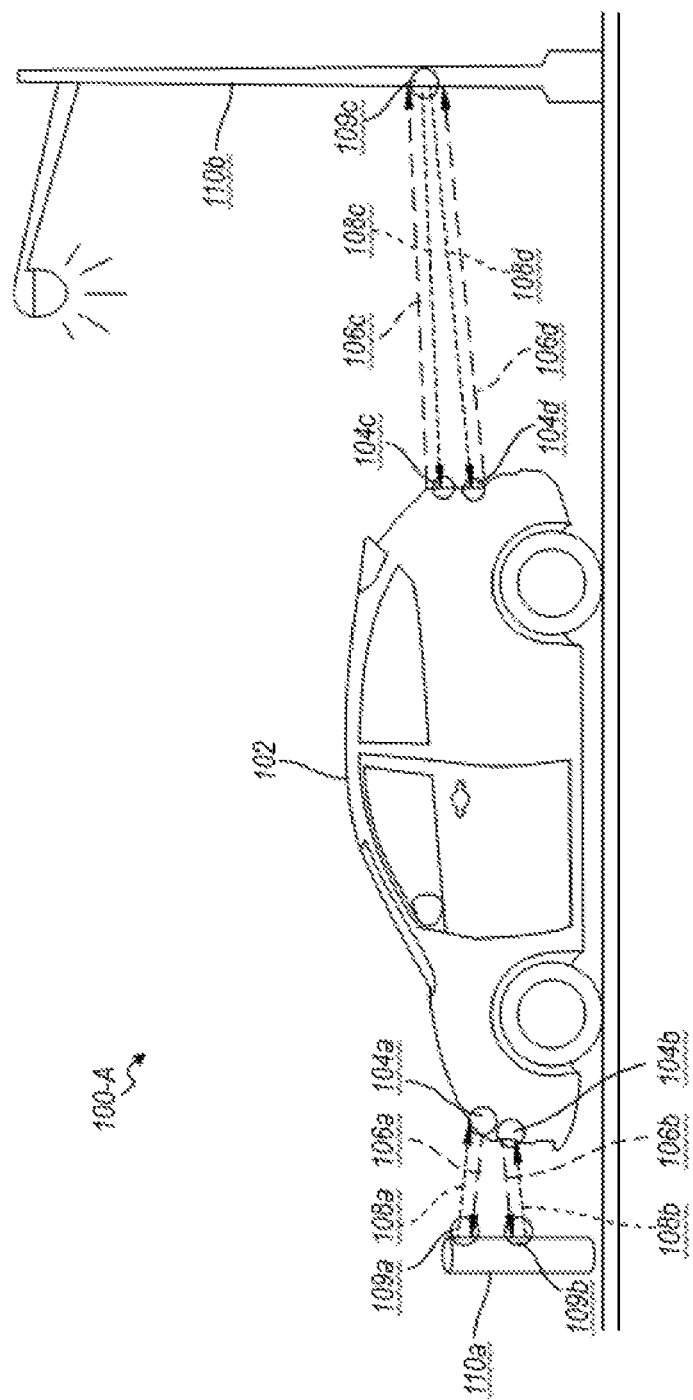
FIG. 1A is a block diagram illustrating a vehicle equipped with an ultrasonic object detection system.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An example ultrasonic object detection system for a vehicle may be configured to determine distance to a given object by emitting an ultrasonic pulse toward the object and calculating a period of time elapsed between a time the pulse was sent and a time the pulse returns to the system after being reflected by the object. In some instances, the emitted sound may encounter several objects, and each may cause a reflected wave.

Accordingly, the system may calculate incorrectly position of the object in cases where the transmitted pulse bounces off an object other than the one it is trying to locate or if the pulse bounces off several objects prior to returning to the vehicle. In some instances, the system may determine distance to the object by analyzing the several returning sound waves to determine which is likely to be from the intended object. In some other instances, pulses reflected from the closest object, whether or not the closest object is the intended object, may dominate the analysis of the several returning sound waves.

In some examples, the ultrasonic object detection system may include a transmitter configured to emit an ultrasonic burst at a predefined frequency. A receiver disposed about an object being located may be tuned to the predefined transmission frequency and may be configured to receive the emitted burst. The receiver of the object may be further configured to send a response (or acknowledgement) burst at another ultrasonic frequency different from the transmission frequency.

The ultrasonic object detection system may analyze the frequency of the received burst to determine whether the frequency of the received burst is different from that of the transmitted burst. If the frequencies are the same, the ultrasonic object detection system may reject the received burst. If the respective frequencies are different, the ultrasonic object detection system may determine position of the object based on a period elapsed between the transmission of the burst and the receipt of the response. Accordingly, a determination of object position by a vehicle system is not affected by a presence of other objects in the path of either the transmitted or the returning ultrasonic wave, since the system does not rely on the signal bouncing off the target and returning, but instead identifies the returning signal by its frequency.

FIG. 1A illustrates an example object-detection system 100-A for a vehicle 102. The vehicle 102 may be of various types of passenger vehicles, such as crossover utility vehicle (CUV), sport utility vehicle (SUV), truck, recreational vehicle (RV), boat, plane or other mobile machine for transporting people or goods.

The vehicle 102 may be equipped with a plurality of ultrasonic sensors 104. The sensors 104 may be disposed on exterior of the vehicle 102 body. Each sensor or several sensors 104 may include a housing and may be generally oriented outward and away from the vehicle 102. The sensors 104 may be oriented to send 106 and receive 108 ultrasonic signals emitted in the vicinity of the vehicle 102. In one example, the sensors 104 include an acoustic transmitter and an acoustic receiver. In some examples, other types of sensors or a combination of acoustic and other sensors may be used. In still other examples, more or fewer sensors 104 may be implemented.

The sensors 104 may be configured to send 106 and receive 108 ultrasonic signals from one or more ultrasonic sensors 109 disposed on exterior of an object 110 being detected by the vehicle 102. The object ultrasonic sensors 109 may be installed on one or more objects in public or private places, e.g., in physically constrained places or in places with poor visibility, such that the sensors 104 of the vehicle 102 may detect the location of the object 110. As one example, the sensors 104a, 104b may each send 106a, 106b and receive 108a, 108b ultrasonic signals from the object sensors 109a, 109b, respectively, when the vehicle 102 is within a predefined distance of the object 110a. As another example, the sensors 104c, 104d may both send 106c, 106d and receive 108c, 108d ultrasonic signals from the object sensor 109c, when the vehicle 102 is within a predefined distance of the object 110b.

Accordingly, ultrasonically sensing, as used herein, may include sending and receiving a positioning signal from the transmission assembly disposed on the object 110 to assist in positioning the vehicle 102 relative to the object 110. Respective signal waveforms of the sensors 104 may overlap with one another to provide greater accuracy in detection of the presence, movement and location of the object 110. The sensors 104 may emit and detect ultrasonic signals that reflect off the objects 110. Based on the sensed signals at the sensors 104, the operation of the vehicle 102 may be controlled, e.g., reducing speed of the vehicle 102 during a parking or driving maneuver, or resuming a parking or driving maneuver once a precise location of the object has been determined.

FIG. 1B illustrates an example communication system 100-B of the vehicle 102. In one example, the sensors 104 may be connected to and in communication with an ultrasonic object detection controller (hereinafter, controller) 112. The controller 112 may include one or more processors 114 connected with both a memory 116 and a computer-readable storage medium 118 and configured to perform instructions 120, commands, and other routines in support of the processes described herein. The controller 112 may monitor and control operation of the ultrasonic sensor 104. In one example, the sensor 104 may include an ultrasonic transponder 150 configured to, responsive to a corresponding command from the controller 112, initiate a broadcast of a presence inquiry signal having a predefined frequency. In another example, the transponder 150 may be configured to detect an acknowledgement signal broadcast having a corresponding frequency different from the frequency of the inquiry signal.

For instance, the controller 112 may be configured to execute instructions of vehicle applications to provide features, such as, but not limited to, object detection, object identification, object movement detection, and so on. In one example, the processor 114 of the controller 112 may be configured to calculate a position of the object 110, including distance and horizontal offset, in response to signals from the sensor 104. Such instructions and other data may be maintained in a non-volatile manner using a variety of types of computer-readable storage medium 118. The computer-readable medium 118 (also referred to as a processor-readable medium or storage) includes any non-transitory (e.g., tangible) medium that participates in providing instructions or other data that may be read by the processor 114 of the controller 112. Computer-executable instructions 120 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The controller 112 may be further configured to communicate with other components of the vehicle 102 via one or more in-vehicle networks 122. For example, the controller 112 may communicate with a first set of vehicle systems, subsystems, or components over a first in-vehicle network 122a, and with a second set of vehicle 102 systems, subsystems, or components over a second in-vehicle network 122b. In other examples, the controller 112 may be connected to more or fewer in-vehicle networks 122. Additionally or alternately, one or more vehicle 102 systems, subsystem, or components may be connected to the controller 112 via different in-vehicle networks 122 than shown, or directly, e.g., without connection to an in-vehicle network 122.

The in-vehicle networks 122 may include one or more of a vehicle controller area network (CAN), an Ethernet network, or a media oriented system transfer (MOST), as some examples. The in-vehicle networks 122 may allow the controller 112 to communicate with other vehicle 102 systems, such as a global positioning system (GPS) controller 124 and an in-vehicle display 126 configured to provide current vehicle 102 location and heading information, and various vehicle controllers 128 configured to provide other types of information regarding the systems of the vehicle 102.

As some non-limiting possibilities, the vehicle controllers 128 may include a powertrain controller configured to provide control of engine operating components (e.g., idle control components, fuel delivery components, emissions control components, etc.) and monitoring of engine operating components (e.g., status of engine diagnostic codes); a body controller configured to manage various power control functions such as exterior lighting, interior lighting, keyless entry, remote start, and point of access status verification (e.g., closure status of the hood, doors, and/or trunk of the vehicle 102); a radio transceiver configured to communicate with key fobs or other local vehicle 102 devices; and a climate control management controller configured to provide control and monitoring of heating and cooling system components (e.g., compressor clutch and blower fan control, temperature sensor information, etc.).

The ultrasonic object detection controller 112 may be connected to and in communication with the in-vehicle display 126. The in-vehicle display may be a dashboard multifunction display or other displays as appropriate. The controller 112 may be configured to provide positional information to a driver via the in-vehicle display 126, such as, but not limited to, a position of the object 110 and a position of the vehicle 102 with respect to one another. The in-vehicle display 126 may include any appropriate representation of the vehicle 102 positional information to illustrate the vehicle 102 position and orientation, including distance and horizontal offset relative to the object 110. In response to this information, the driver may more accurately maneuver the vehicle 102 with respect to the object 110.

As one example, the vehicle 102 may be equipped with an auto park system. In such an example, a controller, which may be the controller 112 or other vehicle controllers 128, may command various vehicle systems to coordinate an automatic parking event. During an automatic parking event, vehicle steering, acceleration, and braking systems (not illustrated) may be automatically controlled to park the vehicle 102 in an appropriate parking location and orientation. The controller 112 and/or vehicle controllers 128 may use the positional information from the sensors 104 to coordinate the various systems and position the vehicle 102 relative to the objects 110.

FIG. 2A illustrates a perspective view 200-A of the ultrasonic sensor 104 of the vehicle 102. The sensor 104 may include a housing 202 configured to retain at least a portion of a connector body 204 and connection terminals 206. In some instances, the ultrasonic transponder 150 described in reference to Figure B may be disposed within the housing 202 of the sensor 104 and may be configured to send and receive ultrasonic signals. In some other instances, the processor 114 may be connected to the ultrasonic transponder 150 via the terminals 206 and may monitor and control operation of the ultrasonic transponder 150 using the same. Additionally or alternatively, the processor 114, like the ultrasonic transponder 150, may be disposed within the housing 202 of the sensor 104 and may use the terminals 206 to transmit signals between the sensor 104 and the in-vehicle networks 122.

FIG. 2B illustrates a partial cross-section view 200-B of the ultrasonic sensor 104. The housing 202 may include a metal case 208. A layer of piezoelectric material 210 may be sandwiched by thin high conductivity electrode layers, e.g., layers of gold or platinum, with or without an underlying adhesion layer, e.g., a layer of chromium or titanium, and may be connected with the terminals 206. In one example, generating an excitation within one or both terminals 206 may cause the piezoelectric material 210 to oscillate and/or deflect in a predefined pattern, such as, but not limited to, oscillate and/or deflect in a longitudinal vibration. In some instances, thickness of the piezoelectric material 210 layer and longitudinal velocity of sound directed toward the material 210 causing corresponding vibrations may influence an anti-resonant frequency value of the sensor 104. One or more of an absorber 212, a stiffener 214, and a damper 216 may form a backing layer of the sensor 104 and may be configured to dampen vibrations of the piezoelectric material 210.

With reference to FIGS. 1A-1B, the vehicle 102 may include one or more ultrasonic sensors 104. The ultrasonic sensors 104 in communication with the controller 112 may be disposed at predefined locations about exterior of the vehicle 102, e.g., front portion of the vehicle 102, proximate to each of the vehicle 102 headlights, and so on. In one example, one or more sensors 104 may be disposed about a front bumper of the vehicle 102.

Other locations for the ultrasonic sensors 104 are also contemplated. For example, the sensors 104 may be operatively coupled to a different exterior or interior portion of the vehicle 102, rather than the front bumper. In one or more variations, the sensors 104 may be operatively coupled to an underbody, sides, roof, windshield of the vehicle 102. The above and other sensor 104 locations may all be used in conjunction with methods according to the present disclosure. In some examples, the vehicle 102 may be equipped with an automatic parking system, and the positional information is used by an automatic parking system to facilitate hands-free parking. In some other examples, the vehicle 102 may be equipped with an object detection system, an adaptive cruise control system, a lane departure warning system, and so on, that use information transmitted and received by the sensors 104.

The sensor 104 may be configured to emit bursts of sound at frequencies outside a range of frequencies perceptible by a human ear. Further, the sensor 104 may be configured to detect an echo signal returned, e.g., reflected, from the object 110. The sensor 104 may transmit signals to determine whether an object is present in the vicinity of the vehicle 102 and the distance to that object. For example, the sensor 104 may compute the distance to the object 110 based on a period of time between the initial signal transmission and the receipt of the echo signal. In some cases, the echo signal may be lost or dissipated prior to reaching the sensor 104, such as when the echo signal is directed away from the sensor 104 due to the orientation of the object 110 relative to the sensor 104 or when the material, from which the object is made, either partially absorbs the transmitted ultrasonic signals or simply serves as a poor reflector of an ultrasonic signal waveform.

Figure 3:
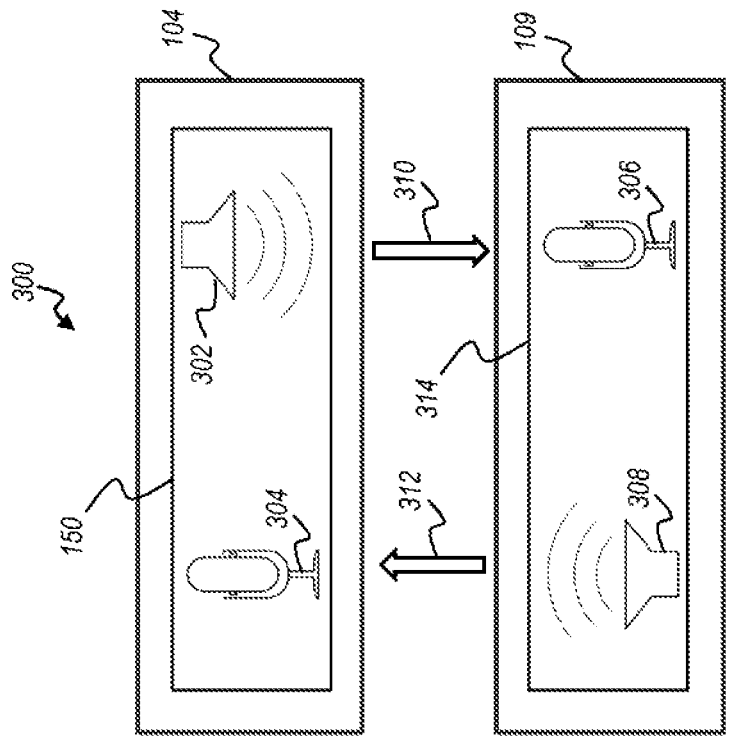
FIG. 3 a block diagram illustrating object positioning using an ultrasonic pulse frequency.

FIG. 3 illustrates an example signal transmission arrangement 300 of the ultrasonic sensor 104 signals. The controller 112 of the vehicle 102 may be configured to issue a command to the sensor 104 to generate an acoustic signal. As one example, the controller 112 may issue the command to generate an acoustic signal responsive to a selection (or activation) of a park-assist operating mode of the vehicle 102. As another example, the controller 112 may issue the command to generate an acoustic signal responsive to a REVERSE transmission gear of the vehicle 102 being selected (or activated). As still another example, the controller 112 may issue the command to generate an acoustic signal responsive to activation of an object detection system of the vehicle 102, such as, but not limited to, a lane-departure warning system, an adaptive cruise control system, and so on.

Responsive to the command, the ultrasonic transponder 150 of the sensor 104 may be configured to transmit or broadcast signals having a predefined frequency. In one example, the transponder 150 may include an ultrasonic transmitter 302 configured to emit bursts of sound at frequencies outside a range of frequencies perceptible by a human ear, such as, but not limited to, at frequencies outside the range of 20 hertz (Hz) and 20 kHz. In some instances, the transmitter 302 may be configured to transmit ultrasonic pulses at frequencies greater than 20 kHz, e.g., 30 kHz.

The transponder 150 may further include an ultrasonic microphone 304 that may be tuned to receive acoustic signals having frequencies outside the range of 20 Hz and 20 kHz and, more specifically, having frequencies greater than 20 kHz. In some instances, the microphone 304 of the vehicle ultrasonic sensor 104 may be configured to detect ultrasonic signals having one or more frequencies different from corresponding frequency of the signals transmitted by the ultrasonic transmitter 302.

Accordingly, the ultrasonic transponder 150 of the sensor 104 may be configured to detect returned ultrasonic signals originating from one or more corresponding transponders 314 of the object sensors 109 operatively disposed about the objects 110. The object sensors 109 may be disposed on one or more objects 110 likely to be within a path of a maneuvering vehicle 102, such as, but not limited to, parking meters, street and traffic signage, objects 110 located within physically constrained areas, objects 110 located in areas with poor visibility, and so on.

In one example, the transponder 314 of the object sensor 109 may be configured to broadcast and detect broadcasted ultrasonic signals, such as ultrasonic signals broadcasted by the transponder 150 of the vehicle sensor 104. The transponder 314 may include an object sensor microphone 306 and an object sensor transmitter 308. The microphone 306 may be configured to detect ultrasonic signals having one or more predefined frequencies, such as position inquiry signals 310 originating from the transmitter 302 of the vehicle 102. Responsive to detecting a position inquiry signal 310, the transmitter 308 of the object transponder 314 may be configured to initiate broadcasting an acknowledgement signal 312.

In some instances, the transponder 314 of the object sensor 109 may be configured to determine frequency of the ultrasonic signal detected by the object sensor microphone 306. Responsive to determining the frequency of the received signal, the transponder 314 may command the transmitter 308 to broadcast the acknowledgement signal 312 having frequency different from the received signal 310 frequency. As an example, respective frequencies of the ultrasonic signals 310 and 312 may differ by 10 kHz.

Figure 4A:
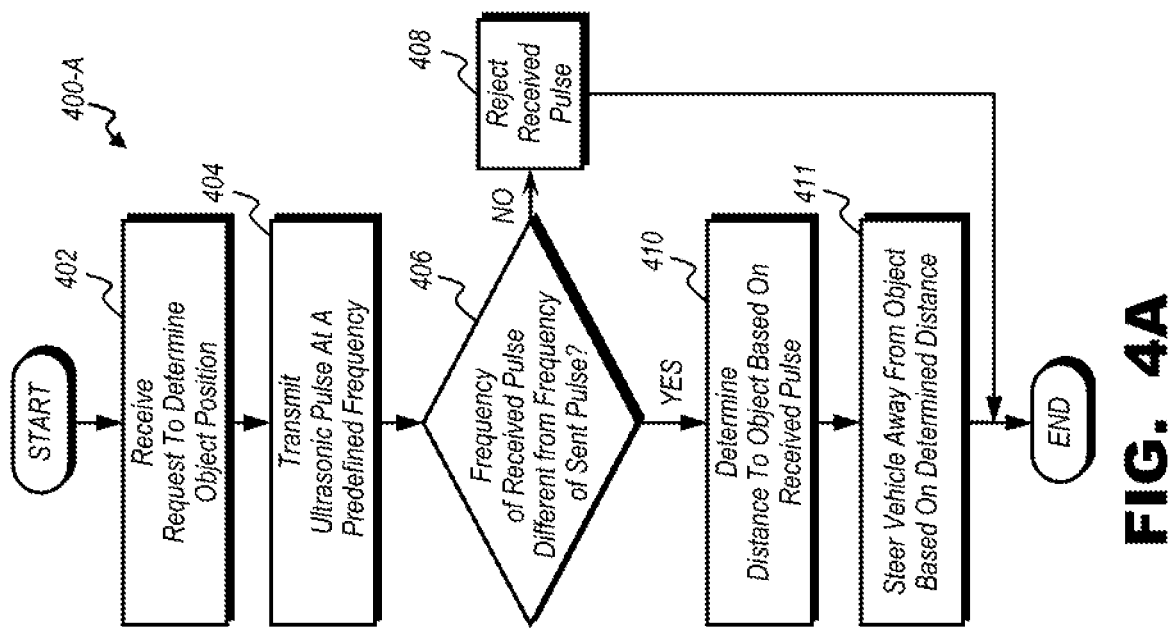
FIGS. 4A-4B are flowcharts illustrating algorithms for an ultrasonic sensing object detection system.

FIG. 4A illustrates an example process 400-A for multi-band ultrasonic locating for the ultrasonic sensor 104 of the vehicle 102. The process 400-A may begin at block 402 where the controller 112 receives a request to determine a position or location of the object 110. At block 404 the controller 112 may issue a command to the ultrasonic transponder 150 to transmit the inquiry signal 310 to the object sensor 109. At block 406, responsive to receiving a response (or acknowledgement) signal, the controller 112 may determine whether frequency of the received response signal 312 is different from frequency of the position inquiry signal 310. Additionally or alternatively, responsive to detecting a response signal, the controller 112 may be configured to determine a difference between the corresponding frequencies of the inquiry signal and the received response (or acknowledgement) signal. Accordingly, the controller 112 may compare the difference between frequencies to a difference threshold and may accept the detected response (or acknowledgement) signal if the difference is greater than the threshold.

If frequencies are not different, at block 408 the controller 112 may reject the received response signal. Responsive to frequency of the response ultrasonic signal 312 being different from frequency of the inquiry ultrasonic signal 310, at block 410 the controller 112 may determine distance to the object 110 based on the received response (or acknowledgement) signal 312. The controller 112 at block 411 may steer the vehicle 102 away from the object 110 based on the determined distance to the object 110. The process 400-A may then end. In some instances, the process 400-A may be repeated responsive to receiving a request to determine distance to the object 110 or in response to a different signal or command.

Figure 4B:
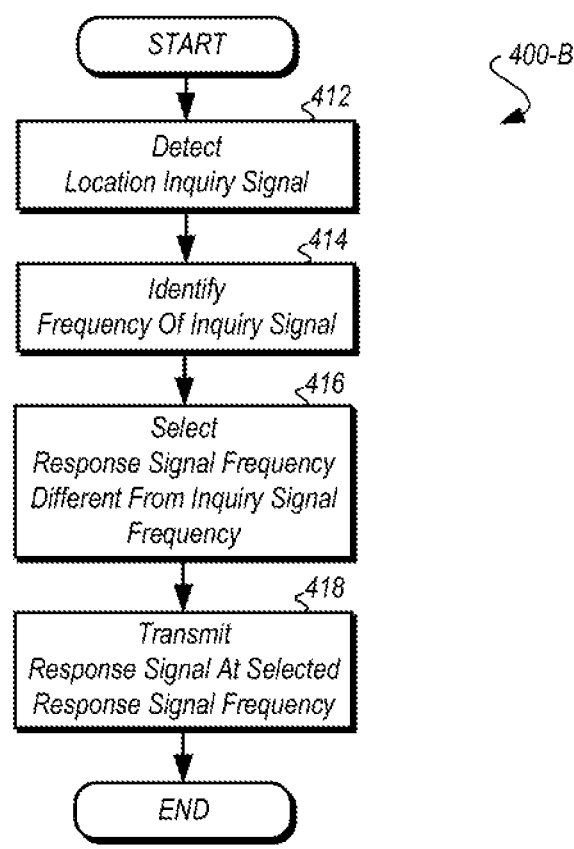

FIG. 4B illustrates an example process 400-B for multi-band ultrasonic locating for the ultrasonic sensor 109 of the object 110. The process 400-B may begin at block 412 where the object sensor 109 receives the inquiry signal 310 from the ultrasonic sensor 104 of the vehicle 102. At block 414 the object sensor 109 may determine frequency of the received inquiry signal 310. The object sensor 109 at block 416 may select frequency of the response (or acknowledgement) signal that is different from the frequency of the inquiry signal 310. At block 418 the object sensor 109 may transmit the response (or acknowledgement) signal 312 using the selected different frequency.

Additionally or alternatively, responsive to detecting an inquiry signal 310 and prior to transmitting the response signal, the object sensor 109 may be configured to determine a difference between the corresponding frequencies of the received inquiry signal and the response (or acknowledgement) signal. Accordingly, the object sensor 109 may compare the difference between frequencies to a difference threshold and may transmit the response signal 312 at the selected frequency if the difference is greater than the threshold. The process 400-B may then end. In some instances, the process 400-B may be repeated responsive to the object sensor 109 detecting the inquiry signal 310 or in response to a different signal or command.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system for a vehicle comprising:
   an ultrasonic sensor including a layer of material such that vibration of the material is indicative of frequency of transmitted and received ultrasonic signals; and
   a controller configured to, through electrical excitation, cause the material to vibrate to transmit an inquiry ultrasonic signal and, responsive to receiving from an object an acknowledgement ultrasonic signal having frequency different from frequency of the inquiry signal, steer the vehicle from the object.

2. The system of claim 1, wherein the controller is further configured to reject the acknowledgement signal and interrupt steering of the vehicle responsive to the frequencies of the acknowledgement and inquiry signals being the same.

3. The system of claim 1, wherein the frequency of the acknowledgement signal is selected among several frequencies.

4. The system of claim 3, wherein the selecting is responsive to detecting the corresponding frequency of the inquiry.

5. The system of claim 1, wherein the frequencies differ by between 1 kHz and 10 kHz.

6. The system of claim 1, wherein the steering is based on a location of the object resulting from a time elapsed between the transmitting and receiving.

7. The system of claim 1, wherein the transmitting of the inquiry signal is responsive to one of an activation of a park-assist operating mode of the vehicle and a selection of a REVERSE transmission gear.

8. A method for a vehicle comprising:
   steering, by a controller, the vehicle away from an object responsive to an acknowledgement ultrasonic signal received via an ultrasonic sensor, that includes a layer of material such that vibration of the material is indicative of frequency of transmitted and received ultrasonic signals, and having frequency different from frequency of an inquiry signal previously generated by the sensor.

9. The method of claim 8, wherein the controller is further configured to reject the acknowledgement signal and interrupt steering of the vehicle responsive to the frequencies of the acknowledgement and inquiry signals being the same.

10. The method of claim 8, wherein the frequency of the acknowledgement signal is selected among several frequencies.

11. The method of claim 10, wherein the selecting is responsive to detecting the corresponding frequency of the inquiry.

12. The method of claim 8, wherein the frequencies differ by between 1 kHz and 10 kHz.

13. The method of claim 8, wherein the steering is based on a location of the object resulting from a time elapsed between the transmitting and receiving.

14. The method of claim 8, wherein the transmitting of the inquiry signal is responsive to one of an activation of a park-assist operating mode of the vehicle and a selection of a REVERSE transmission gear.

15. An object detection system for a vehicle comprising:
   an ultrasonic sensor including piezoelectric crystals; and
   a controller configured to
      power electrical excitation to cause the crystals to oscillate generating an inquiry ultrasonic signal toward an object and
      steer the vehicle from the object responsive to a difference, between corresponding frequencies of the inquiry signal and an acknowledgement ultrasonic signal from the object, being greater than a threshold.

16. The system of claim 15, wherein the steering is based on a location of the object with respect to the vehicle resulting from a time elapsed between the inquiry and acknowledgement signal.

17. The system of claim 16, wherein the difference is greater than 1 kHz.

18. The system of claim 16, wherein the difference is greater than 10 kHz.

19. The system of claim 15, wherein the generating of the inquiry signal is responsive to one of an activation of a park-assist operating mode of the vehicle and a selection of a REVERSE transmission gear.

* * * * *